(12) United States Patent
Nicholls et al.

(10) Patent No.: US 8,401,491 B2
(45) Date of Patent: *Mar. 19, 2013

(54) BASESTATION MAINTENANCE SYSTEMS AND METHOD

(75) Inventors: Charles W. T. Nicholls, Nepean (CA); Scott Widdowson, Ottawa (CA)

(73) Assignee: Research In Motion Limited, Waterloo, Ontario (CA)

(*) Notice: Subject to any disclaimer, the term of this patent is extended or adjusted under 35 U.S.C. 154(b) by 997 days.

This patent is subject to a terminal disclaimer.

(21) Appl. No.: 12/404,687

(22) Filed: Mar. 16, 2009

(65) Prior Publication Data

US 2009/0176531 A1    Jul. 9, 2009

Related U.S. Application Data

(63) Continuation of application No. 11/463,806, filed on Aug. 10, 2006, now Pat. No. 7,519,331.

(60) Provisional application No. 60/707,401, filed on Aug. 11, 2005.

(51) Int. Cl.
*H04B 1/08* (2006.01)
*H04B 1/38* (2006.01)
*H04M 1/00* (2006.01)

(52) U.S. Cl. ........ 455/73; 455/347; 455/561; 455/575.1

(58) Field of Classification Search ................. 455/13.3, 455/344, 346–349, 561–562.1, 575.1, 575.7
See application file for complete search history.

(56) References Cited

U.S. PATENT DOCUMENTS

| | | | | |
|---|---|---|---|---|
| 4,607,389 A * | 8/1986 | Halgrimson | ................. | 455/11.1 |
| 5,570,546 A * | 11/1996 | Butterworth et al. | ........... | 52/111 |
| 6,571,110 B1 * | 5/2003 | Patton et al. | ................... | 455/561 |
| 7,519,331 B2 * | 4/2009 | Nicholls et al. | ................. | 455/73 |
| 2002/0151332 A1 * | 10/2002 | Eddy | .............................. | 455/561 |
| 2003/0148794 A1 * | 8/2003 | Wilson, Jr. | ..................... | 455/562 |
| 2004/0192392 A1 * | 9/2004 | Hoppenstein et al. | ..... | 455/562.1 |
| 2004/0198451 A1 * | 10/2004 | Varghese | .................... | 455/562.1 |
| 2005/0085267 A1 * | 4/2005 | Lemson et al. | ............ | 455/562.1 |
| 2005/0215288 A1 * | 9/2005 | Beaudin et al. | ............ | 455/562.1 |
| 2006/0052065 A1 * | 3/2006 | Argaman et al. | ............. | 455/101 |
| 2006/0229049 A1 * | 10/2006 | Ahonpaa | ....................... | 455/272 |

* cited by examiner

*Primary Examiner* — Simon Nguyen

(74) *Attorney, Agent, or Firm* — Fish & Richardson P.C.

(57) ABSTRACT

A method and system for maintaining a basestation system is provided. The basestation includes a basestation module. The system includes a translating system for translating at least a portion of the basestation module between a first position and a second position. The system includes a connection module for detachably connecting to the portion of the basestation module when the portion of the basestation circuitry is at the second position.

23 Claims, 4 Drawing Sheets

BASESTATION MAINTENANCE SYSTEMS AND METHOD

CROSS-REFERENCE TO RELATED APPLICATIONS

This application claims priority from U.S. Provisional Application No. 60/707,401 filed Aug. 11, 2005, which is hereby incorporated by reference in its entirety.

This application is a continuation of U.S. application Ser. No. 11/463,806, filed on Aug. 10, 2006, now allowed.

FIELD OF INVENTION

The present invention relates to the field of wireless communications, and more specifically to a method and system for maintenance of basestation equipment.

BACKGROUND OF THE INVENTION

Increased capacity demands are driving Multiple Input Multiple Output (MIMO) antenna technology into the basestation architecture. The cabling requirements for conventional ground based electronics and tower mounted antenna, however, become prohibitive with respect to such implementations. As a result, electronic circuitry and other components are being situated at the top or masthead, of a tower. While tower mounting of the basestation Radio Frequency (RF) hardware resolves the cabling issue, maintaining such equipment is expensive. That is because accessing such equipment typically requires specialized cranes or personnel.

Therefore there is a need for providing an improved way to maintain basestation equipment mounted on the tower.

SUMMARY OF THE INVENTION

It is an object of the invention to provide a method and system that obviates or mitigates at least one of the disadvantages of existing systems.

In accordance with an aspect of the present invention, there is provided a connection module for use in a basestation system. The basestation system includes a basestation module and a translating system for translating at least portion of the basestation module between a first position of a tower and a second position of the tower. The connection module is detachably connected to the portion of the basestation module when the portion of the basestation module is at the second position.

In accordance with a further aspect of the present invention, there is provided a translating system for use in a basestation system having a basestation module. The translating system translates at least portion of the basestation module between a first position and a second position. The portion of the basestation module is detachably connected to a connection module when the portion of the basestation module is at the second position.

In accordance with a further aspect of the present invention, there is provided a method for maintenance of a basestation system having a translating system and a basestation module. The method comprises the steps of: translating at least portion of the basestation module between a first position and a second position, the first position being different from the second position; and detachably connecting a connection module to the at least portion of the basestation module at the second position.

This summary of the invention does not necessarily describe all features of the invention.

BRIEF DESCRIPTION OF THE DRAWINGS

These and other features of the invention will become more apparent from the following description in which reference is made to the appended drawings wherein.

DETAILED DESCRIPTION

Embodiments of the present invention are described using a basestation having Radio Frequency (RF) equipment placed at the top of a tower when providing a network service. However, the tower mounted equipment may be any equipment other than the RF equipment.

In the description below, the terms "top", "tower top" and "masthead" may be used interchangeably. In the description below, the terms "tower" and "mast" may be used interchangeably. In the description below, the terms "tower mounted equipment" and "masthead equipment" may be used interchangeably. In the description below, the terms "top" and "base" are being used in the general sense to depict two positions of the tower, one position being higher than another position.

In the description below, the terms "couple(ed)" and "connect(ed)" may be used interchangeably. These terms may be used to indicate that two or more elements are directly or indirectly in physical or electrical contact with each other.

Figure 1:
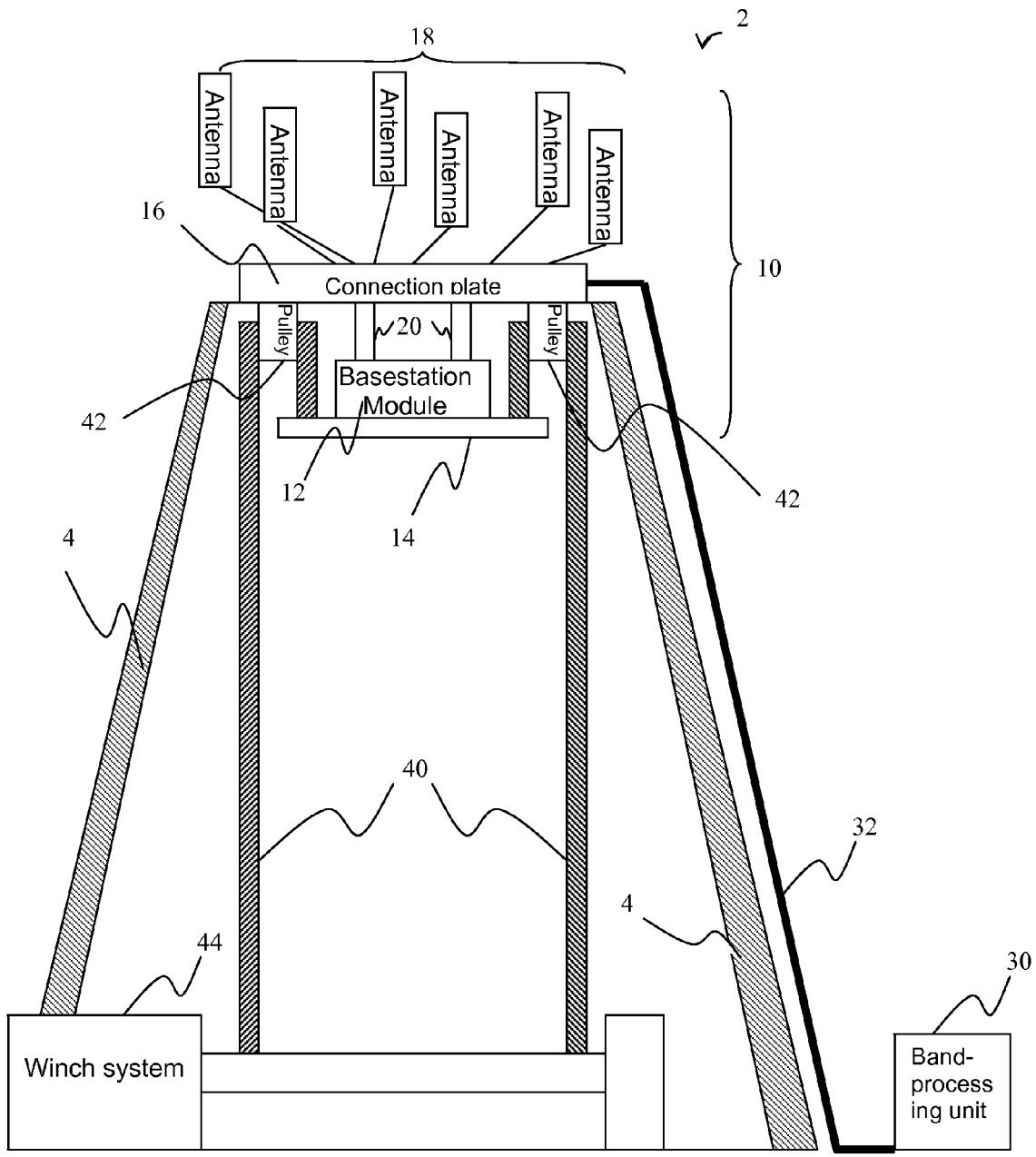
FIG. 1 illustrates an example of a basestation system in accordance with an embodiment of the present invention.

FIG. 1 illustrates an example of a basestation system in accordance with an embodiment of the present invention. The basestation system 2 includes basestation equipment 10 mounted on the top of a tower 4, hereinafter referred to as tower mounted equipment 10. The tower mounted equipment 10 may form masthead equipment. The tower 4 may be, but not limited to, a cellular tower. Those of ordinary skill in the art will appreciate that the tower mounted equipment 10 may be located at varying altitudes on the tower. The basestation system 2 may be a basestation tower operating in accordance with, but not limited to, at least one of Wideband Code Division Multiple Access (CDMA), Global System for Mobile (GSM) and Universal Mobile Telecommunications System (UMTS) wireless standards or next generation OFDM based wireless standards.

The tower mounted equipment 10 includes one or more basestation modules including a basestation radio module 12 and an antenna system 18. The antenna system 18 is secured to the top of the tower 4. Those of skill in the art will understand that the representation of the antenna system 18 is schematic only, and the actual configuration of these elements may take on a variety of configurations.

The basestation system 2 includes mechanism for translating the basestation radio module 12 between the top and base of the tower 4 and enabling the tower mounted equipment 10 to operate when the basestation radio module 12 is located at the tower top.

The basestation radio module 12 is detachably mounted on a basestation module platform 14. The basestation radio module 12 may be unloaded from the basestation module platform 14 for maintenance purpose. The antenna system 18 is mounted on a connection plate 16. The connection plate 16 is secured on the top of the tower 4.

The basestation radio module 12 is detachably coupled to the connection plate 16 at the tower top. The tower mounted equipment 10 is operable when the basestation radio module 12 is connected to the antenna system 18. The basestation radio module 12 is lowered for its maintenance purpose, while the basestation radio module 12 is raised and connected to the antenna system 18 at the tower top to provide a network service.

In FIG. 1, the connection plate 16 is formed separately from the antenna system 18. However, in another example, the connection plate 16 or similar connection mechanism may be formed in the module of the antenna system 18. In a further example, the connection plate 16 or similar connection mechanism may be formed in any intermediate modules to connect the basestation radio module 12 to the antenna system 18 or any other electronic modules. In a further example, the connection plate 16 or similar connection mechanism may form part of the tower itself In FIG. 1, the basestation radio module 12 is connected to the antenna system 18. However, in another example, the basestation radio module 12 may be connected to any intermediate modules to connect the basestation radio module 12 to the antenna system 18 or any other electronic modules. In FIG. 1, the basestation radio module 12 is connected to the connection plate 16. However, in another example, the basestation radio module 12 may be directly connected to the antenna system 18 or any other electronic modules without using the connection plate 16. Using the connection plate 16 may however provide increased structural support for the components to which the basestation radio module 12 connects.

In FIG. 1, one tower mounted equipment 10 is shown. However, the basestation system 2 may include more than tower mounted equipment 10. Each tower mounted equipment 10 may be located at a different position of the tower 4. In FIG. 1, one antenna system 18 is shown. However, the basestation system 2 may include more than one antenna system 18. The basestation system 2 may include more than one connection plate 16 for more than one antenna system 18. In FIG. 1, one basestation radio module 12 is shown. However, the basestation system 2 may include more than one basestation radio module 12. The basestation system 2 may include more than one basestation module platform 14 for more than one basestation radio module 12.

Figure 2:
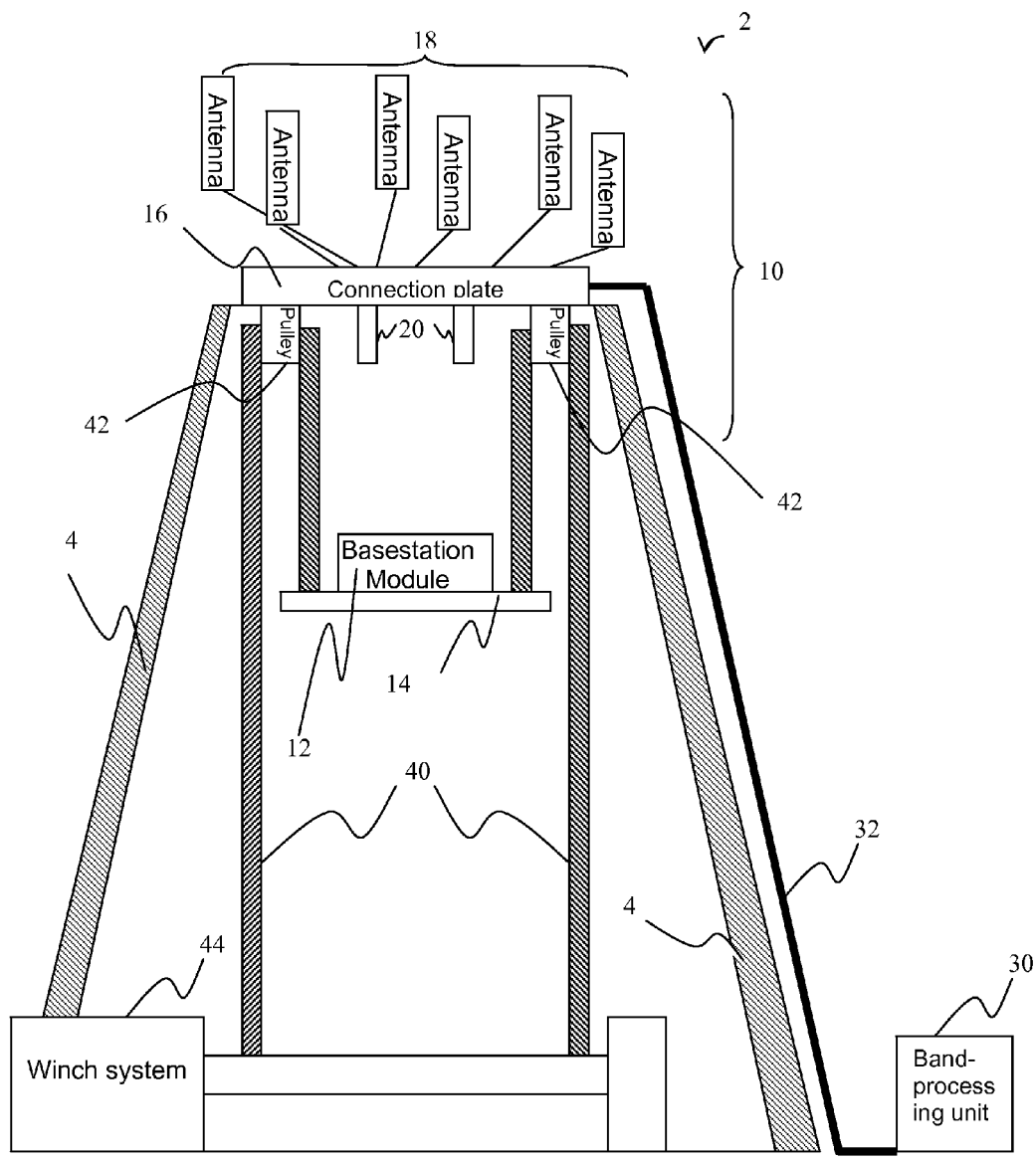
FIG. 2 illustrates an example of the basestation system of FIG. 1 where a basestation radio module is lowered.

In FIG. 1, the basestation radio module 12 is located close to the top of the tower 4. As shown in FIG. 2, the basestation radio module 12 is locatable at a position lower than that of FIG. 1. The basestation radio module 12 may be located at the bottom of the tower 4. However, as described above, it is not required that the basestation radio module 12 be raised or lowered from the absolute bottom or top of the tower respectively.

Referring to FIGS. 1-2, a location guide 20 is provided to ensure the proper alignment of the electrical connectors in the tower mounted equipment 10. In FIGS. 1-2, the location guide 20 is provided to align the basestation radio module 12 with the connection plate 16. However, in another example, the location guide 20 may be provided to align the basestation module platform 14 with the connection plate 16. In a further example, the location guide 20 may be provided to align the basestation radio module 12 or the basestation module platform 14 with a certain position of the tower without using the connection plate 16. In a further example, the location guide 20 may be provided to align the basestation radio module 12 or the basestation module platform 14 with any electronic modules. In a further example, the basestation system 2 may include more than one tower mounted equipment 10, and may include more than one location guide 20 for more than one tower mounted equipment 10.

A cabling and pulley system having a cable 40 and a pulley 42 is provided to the basestation system 2. In FIG. 1, one set of the cable 40 and the pulley 42 is provided to each side of the tower mounted equipment 10. The pulley 42 is connected to the connection plate 16. However, in another example, the pulley 42 may be connected to the structure of the tower 4. The cable 40 is connected to the basestation module platform 14. The basestation radio module 12 is located by raising or lowering the basestation module platform 14. However, in another example, the housing of the basestation radio module 12 may be directly raised or lowered by the cabling and pulley system.

A winch system 44 is provided to wind up the cable 40. The winch system 44 with the cabling and pulley system enables the basestation radio module 12 to be raised or lowered from the masthead. The winch system 44 may be a manual winch system, an automatic winch system or a combination thereof. The winch system 44 may include a crank to enable manual raising and lowering of the basestation radio module 12. The winch system 44 may include gear assemblies and may be powered by gas engine, electric motor, hydraulic cylinder, pneumatic, electric, combustion drives, or any other device for providing rotational shaft power. The winch system 44 may include a braking system or ratchet system.

The power supply to the winch system 44 need not be situated at the base of the tower 4. For example, an electric motor may be attached to the top of the tower 4, in which case a controller (not shown) could be used in conjunction therewith (e.g., a hand held controller, key pad, graphical user interface, etc.).

The winch system 44 may employ a detachable motor that can be temporarily connected to rotate the winch mechanism. Depending on the winch mechanism determined for use the detachable motor may take the form of a compressor in the case of a pneumatic or hydraulic system or a rotational motor as in the case in which a cabling system is used. The specifics of the detachable motor would be readily understood by those skilled in the art.

Those of skill in the art will understand that the representation of the cable 40, the pulley 42 and the winch system 44 are schematic only, and the actual configuration of these elements may take on a variety of configurations. Those of skill in the art will understand that mechanism for raising or lowering the basestation radio module 12 may be implemented in various ways other than those shown in FIGS. 1-2. Wire hawsers, track, hydraulic cylinder, pneumatics, chain or gear driven arrangements (e.g., worm gear/rack) may be used.

In FIGS. 1-2, the translating system for translating one basestation module platform 14 is shown. However, in another example, the basestation system 2 may include more than one basestation module platform 14, and the translating system in the basestation system 2 may translate each basestation module platform 14. In a further example, the translating system in the basestation system 2 may translate each basestation radio module directly without using the basestation module platform 14. That is to say, the mechanism for raising and lowering the basestation radio module 12 could be directly connected to the basestation radio module 12.

The basestation system 2 includes a ground based baseband processing unit 30 for transmission and reception of low power digital communications data and power to and from the core network and to and from the tower mounted equipment 10. The basestation system 2 includes a communication cable 32 from the ground based base-band processing unit 30 to the basestation radio module 12 to convey power and base-band data between the ground and the basestation radio module 12.

In order to prevent damage to the communication cable 32 connecting the basestation radio module 12 to the network connection, the basestation system 2 uses a plug and socket arrangement such that the communication cable 32 is disconnected from the basestation radio module 12 when the basestation radio module 12 is lowered from the tower top, and is connected to the basestation radio module 12 when the basestation radio module 12 is raised and is positioned at the tower top.

In FIGS. 1-2, the communication cable 32 is attached at the top of the tower 4 to the connection plate 16 so that the basestation radio module 12 can be removed from the basestation module platform 14 and replaced or serviced, without having to bending the communication cable 32 when the basestation radio module 12 is lowered from the top of the tower 4.

In some radio towers there may be a requirement to service multiple operators' equipment. In such a scenario multiple antenna location plates may be present at various heights along the vertical axis of the mast. In such a scenario each operator's equipment may incorporate a separate winch system for location of the base station equipment. In addition, in the case where the multiple operators use the tower, multiple fixed communication cables may ascend the tower. Those skilled in the art can readily extend the embodiments for maintenance of single basestation to application to multiple platforms at multiple heights to service multiple operators.

In FIGS. 1-2, single communication cable 32 is shown. However, in an alternative embodiment, more than one communication cable may be used for providing power, data or a combination thereof to the basestation radio module 12.

Figure 3:
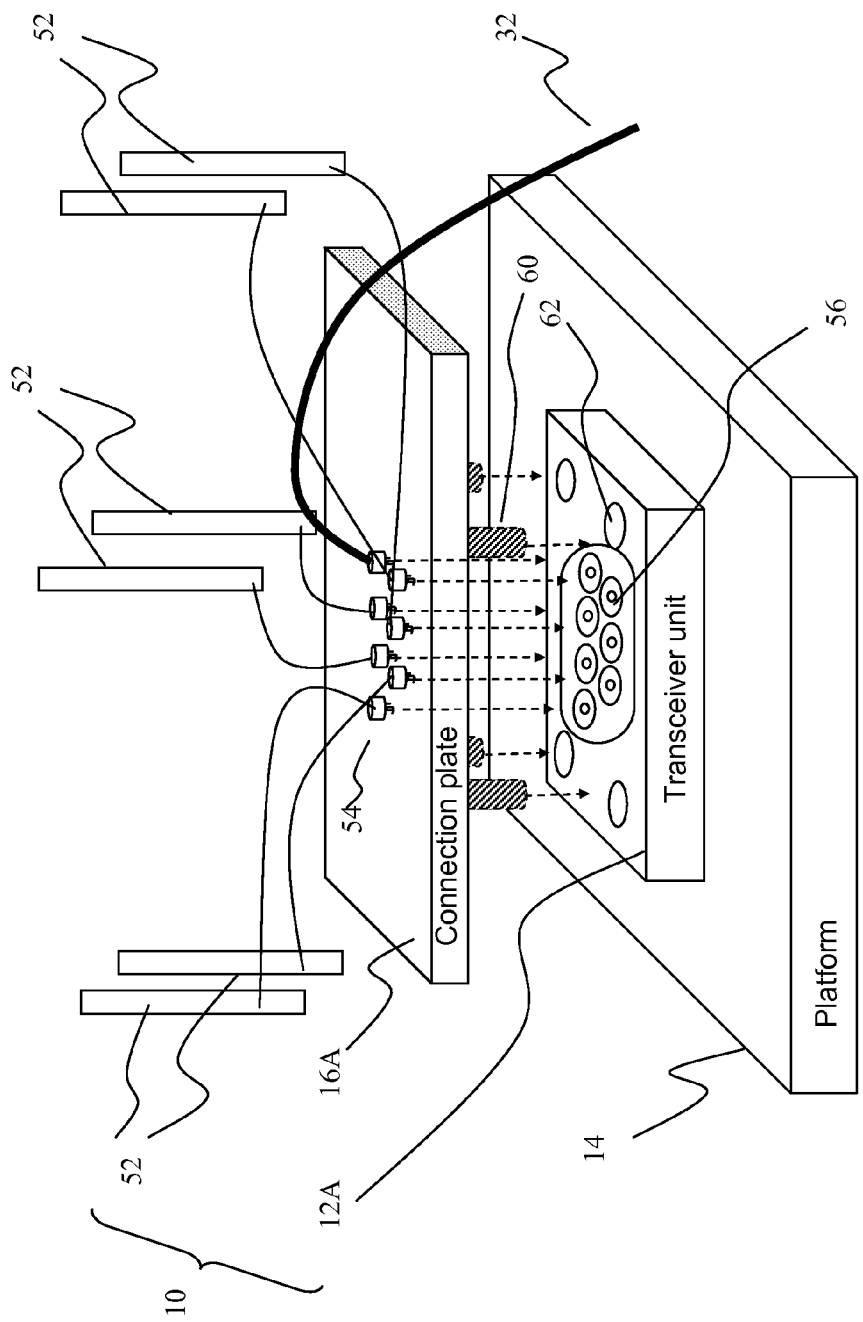
FIG. 3 illustrates an example of the tower mounted equipment, the basestation module platform and the connection plate of FIGS. 1-2.

FIG. 3 illustrates an example of the tower mounted equipment, the basestation module platform and the connection plate of FIGS. 1-2. The tower mounted equipment 10 of FIG. 3 includes a basestation RF transceiver unit 12A including elements for transmission and reception of cellular RF signals in a multi-sector environment. The basestation RF transceiver unit 12A is mounted on the basestation module platform 14.

In FIG. 3, one RF transceiver unit 12A is shown as an example of the basestation radio module 12 of FIG. 1. However, more than one basestation radio module may be attached to the basestation module platform 14 and be raised or lowered.

The tower mounted equipment 10 includes main and diversity antennas 52 that form the antenna system 18 of FIG. 1 or a part of the antenna system 18. Those of skill in the art will understand that the representation of the main and diversity antennas 52 is schematic only, and the actual configuration of the main and diversity antennas 52 may take on a variety of configurations.

In FIG. 3, a connection plate 16A with blind mate connectors 54 is shown as an example of the connection plate 16 of FIG. 1. The connection plate 16A is secured to the tower top. The main and diversity antennas 52 are mounted on the connection plate 16A. The connection plate 16A enables connection of the basestation RF transceiver unit 12A to the main and diversity antenna 52. The communication cable 32 is attached to the connection plate 16A. The connection plate 16A also enables connection of the basestation RF transceiver unit 12A to the communication cable 32. The communication cable 32 is not subject to bending associated with it having to follow the basestation RF transceiver unit 12A down the tower.

In FIG. 3, the connection plate 16A is provided for one basestation RF transceiver unit 12A. However, the connection plate 16A may be modified to accommodate multiple RF basestation transceiver units in the case that multiple service providers are connected to the tower.

The enclosure of the basestation RF transceiver unit 12A incorporates blind mate connectors 56 into its top surface. The blind mate connectors 56 in the enclosure of the basestation RF transceiver unit 12A are coupled with the blind mate connectors 54 in the connection plate 16A. The blind mate connectors 56 may be encompassed by a rubber 'O' ring seal to prevent water ingress.

In FIG. 3, the blind mate connectors 54 are formed in the connection plate 16A. However, in another example, the blind mate connectors 54 or any other connection mechanism for connecting the RF transceiver unit 12A to the antenna 52 may form part of the structure of the tower or may be formed in the housing of any electronic modules. In a further example, the antenna module associated with the antenna 52 may have a connection mechanism and be connected to the RF transceiver unit 12A without using the connection plate 16A.

In FIG. 3, location guide rods 60 and location alignment holes 62 are shown as an example of the location guide mechanism 20 of FIG. 1. The location guide rods 60 slide into the location alignment holes 62. The location alignment holes 62 receive the location guide rods 60 to facilitate blind mate electrical connection of the blind mate connectors 54 and 56.

In FIG. 3, four location guide rods and four location alignment holes are shown. However, the number of the location guide rods and the location alignment holes is not limited to four and it may be varied depending on the design and requirements of the basestation.

In FIG. 3, the location guide rods 60 are attached to the connection plate 16A and the location alignment holes 62 are arranged in the housing of the basestation RF transceiver unit 12A. However, in another example, the location guide rods 60 may be attached to the housing of the basestation RF transceiver unit 12A, and the location alignment holes 62 may be arranged in the connection plate 16A.

In another example, the location guide rods 60 may be attached to the housing of the antenna system (e.g., 18 of FIGS. 1-2, 52 of FIG. 3) or any other electronic modules. In a further example, the location alignment holes 62 may be formed in the housing of the antenna system (e.g., 18 of FIGS. 1-2, 52 of FIG. 3) or any other electronic modules. In a further example, the location guide rods 60 or the location alignment holes 62 may be formed in the structure of the tower.

In a further example, the location guide rods 60 or the location alignment holes 62 may be arranged in the housing of any basestation module(s) on the basestation module platform 14 other than the basestation RF transceiver unit 12A.

In a further example, the location guide rods 60 and the location alignment holes 62 are arranged such that the location alignment holes 62 are formed in the basestation module platform 14. This arrangement enables the location alignment holes 52 to be removed from the basestation RF transceiver unit 12A, and thus it may reduce the size of the basestation RF transceiver unit 12A.

In a further embodiment, the communication cable 32 of FIGS. 1-3 may be sufficiently flexible to sustain the mechanical bend radii associated with lowering the basestation module from the tower top.

In a further embodiment, the tower mounted equipment 10 of FIGS. 1-2 may use a waveguide rather than the communication cable 32.

Figure 4:
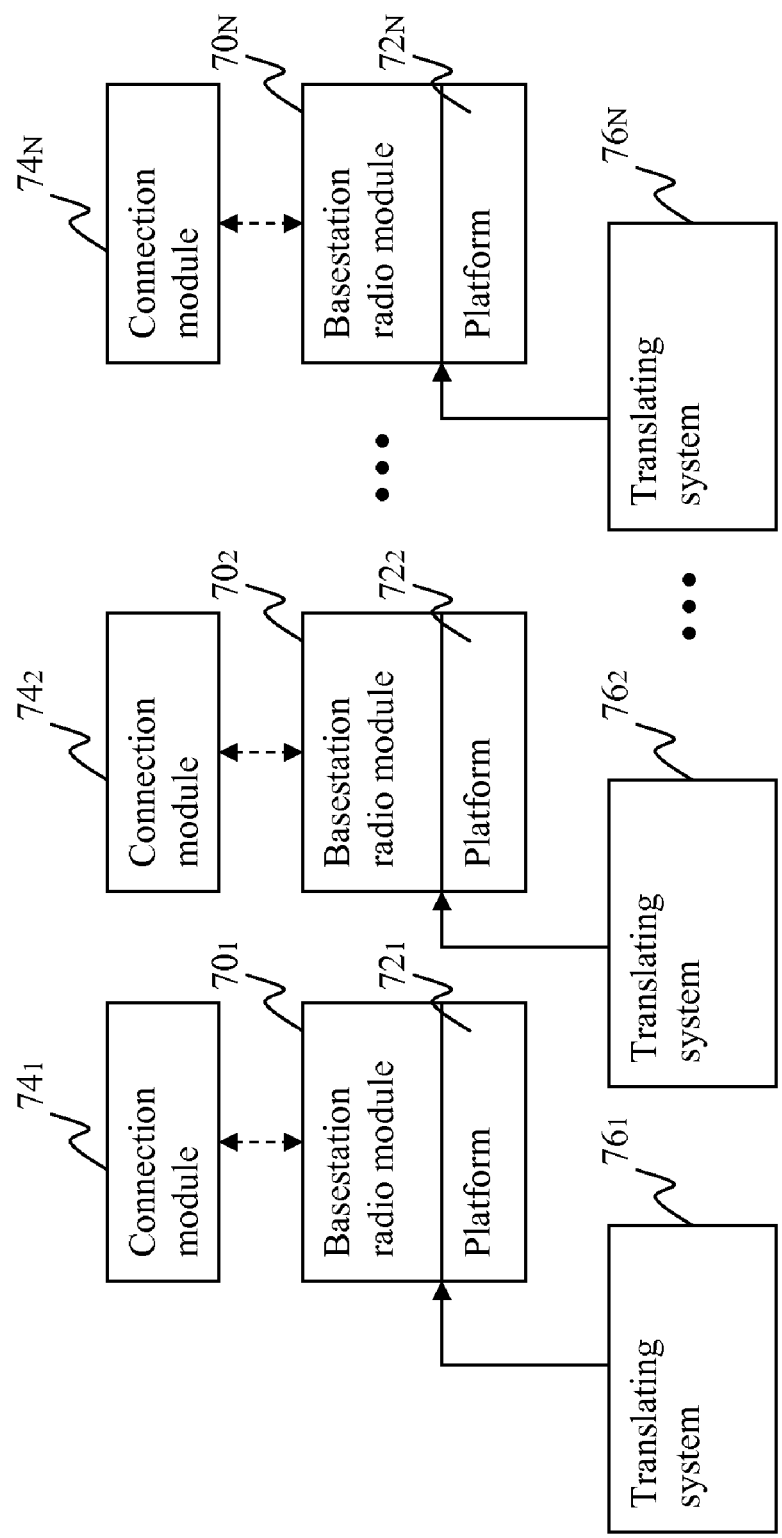
FIG. 4 illustrates an example of a plurality of basestation radio modules and mechanism for raising/lowering them and enabling them.

Referring to FIG. 4, there is illustrated a plurality of basestation radio modules to be raised or lowered. Basestation radio modules $70_1$-$70_N$ (N: integer) are mounted on basestation module platforms $72_1$-$72_N$, respectively. Each of the basestation radio modules $70_1$-$70_N$ may be same or similar to the basestation radio module 12 of FIGS. 1-2 or the basestation radio module 12A of FIG. 3. Each of the basestation module platforms $72_1$-$72_N$ may be same or similar to the basestation module platform 14 of FIGS. 1-2. Connection modules $74_1$-$74_N$ are provided to the basestation radio modules $70_1$-$70_N$, respectively. Each of the connection modules $74_1$-$74_N$ may be same or similar to the connection plate 16 of FIGS. 1-2 or the connection plate 16A of FIG. 3. The connection modules $74_1$-$74_N$ may be formed in any electronic modules (e.g., antenna system or any intermediate electronic systems) or form part of the tower. One or more than one communication cable (e.g., 32 of FIGS. 1-3) may be located at each connection module.

Translating systems $76_1$-$76_N$ are provided to the basestation radio modules $70_1$-$70_N$, respectably. Each of the translating systems $76_1$-$76_N$ may include the cabling and pulley system and the winch system 44 of FIGS. 1-2 or any suitable alternative mechanism for raising or lowering the basestation radio module. The translating systems $76_1$-$76_N$ raise or lower the basestation module platforms $72_1$-$72_N$, respectively. The translating systems $76_1$-$76_N$ may directly raise or lower the basestation radio modules $70_1$-$70_N$, respectively, without using the basestation module platforms $72_1$-$72_N$.

The connection modules $74_1$-$74_N$ are detachably connected to the basestation radio module $70_1$-$70_N$, respectively and enable them to operate, respectively. The connection modules $74_1$-$74_N$ may be located at different positions of the tower, and thus the basestation radio modules $70_1$-$70_N$ may be enabled at different positions of the tower. The basestation radio modules $70_1$-$70_N$ may be lowered for maintenance at different positions of the tower for maintenance. A location guide (e.g., 20 of FIGS. 1-2, 60 and 62 of FIG. 2) may be provided for each basestation radio module $70_1$-$70_N$ for proper alignment.

In FIG. 4, "N" is an integer greater than one. However, "N" may be one. In FIG. 4, a plurality of translating systems $76_1$-$76_N$ are shown separately. However, the plurality of translating systems $76_1$-$76_N$ may share some elements, such as power source.

There are number of technical advantages to placing RF electronics of a basestation at the tower top. One reason is that a single cable run (e.g., 32 of FIGS. 1-3) from the base of the tower to the top can be used to convey both power and data. Additionally, such electronics can be used to minimize the number of cables required for MIMO functionality, for example. This eliminates the up front cost and maintenance of multiple high quality RF cable runs normally required. In addition when receiver equipment is located at the tower base, cable loss directly impacts the receiver noise figure. RF power is also dissipated in the cable runs making the power amplifiers less efficient than those placed at the tower top.

One issue with tower mounted equipment in conventional systems is the cost to maintain the equipment, as specialized cranes and technicians are typically required to access and service the equipment. Additionally, to avoid such maintenance costs, tower mount electronics component costs are typically increased to realize a higher mean time to breakdown failure rate than ground based equipment. Furthermore, circuit complexity is often increased to provision for redundant circuitry capable of making the tower mounted equipment resilient to circuit component failures.

By contrast, according to the embodiments of the present invention, on detection of a fault in the tower mounted equipment a single operator (e.g., person or a control signal to the winch system 44) may lower the basestation module from the tower top using the translating mechanism. Once lowered the defective component may be replaced or, alternatively, the entire module may be returned to the vendor for repair. The module may be returned to a factory for testing. New or repaired module then will be raised by the single operator to the tower top for service.

The maintenance arrangement/scheme of the embodiments of the present invention removes the requirement for a crane or specialized service personnel to service tower mounted equipment. The arrangement of the embodiments of the present invention removes the insurance costs associated with sending service personnel up the tower. The arrangement of the embodiments of the present invention reduces costs associated with over-provisioning masthead electronics. For example, Mean Time Between Failure (MTBF) of a ground based equipment may be used for the maintenance of the tower mounted equipment because of low cost service mechanism hence reducing initial design costs and specifications.

The maintenance arrangement/scheme of the embodiments of the present invention removes the performance degradation in the receiver sensitivity and PA efficiency associated with the cable runs required for ground based radio transceiver modules.

The maintenance arrangement/scheme of the embodiments of the present invention enables high capacity data services based on, for example, MIMO OFDM, leading to lower cost per bit for the service.

The single communication cable arrangement (e.g., 32 of FIGS. 1-3) is applicable to cable intensive basestation architecture, such as MIMO that normally requires up to 18 cables, and thus increases the viability of the MIMO technology and the design flexibility of radio modules.

The present invention has been described with regard to one or more embodiments. However, it will be apparent to persons skilled in the art that a number of variations and modifications can be made without departing from the scope of the invention as defined in the claims.

What is claimed is:

1. A connection module for use in a basestation system, the basestation system comprising a basestation module and a translating system for translating at least portion of the basestation module between a first position and a second position, the second position proximate a top portion of the basestation system, wherein the connection module is detachably connected to the portion of the basestation module when the portion of the basestation module is at the second position.

2. The connection module as claimed in claim 1, further comprising a connection plate secured at the second position, and wherein the portion of the basestation module is detachably connected to the connection plate by the translating system.

3. The connection module as claimed in claim 2, further comprising a location guide for guiding the portion of the basestation module for proper alignment with the connection plate.

4. The connection module as claimed in claim 3, further comprising a location guide for guiding the portion of the basestation module for proper alignment of the basestation module at the second position.

5. The connection module as claimed in claim 4, wherein the portion of the basestation module is situated on a platform, and wherein the translating system raises or lowers the platform.

6. The connection module as claimed in claim 5, further comprising a location guide for guiding the platform for proper alignment of the basestation module at the second position.

7. The connection module as claimed in claim 1, further comprising a first connector located at the second position, and wherein the at least portion of the basestation module includes a second connector for detachably connecting to the first connector.

8. The connection module as claimed in claim 7, further comprising a location guide for proper alignment of the first connector and the second connector at the second position.

9. The connection module as claimed in claim 1, wherein an antenna is provided at the second position, and wherein the connection module connects a transceiver module to the antenna at the second position.

10. The connection module as claimed in claim 9, wherein a communication cable is provided at the second position, and wherein the connection module connects the transceiver module to the communication cable at the second position.

11. The connection module as claimed in claim 9, further comprising a connection plate secured at the second position, and wherein the transceiver module is detachably connected to the antenna through the connection plate.

12. The connection module as claimed in claim 11, further comprising a connection plate secured at the second position and connected to a communication cable, and wherein the transceiver module is detachably connected to the communication cable through the connection plate.

13. The connection module as claimed in claim 1, wherein the least portion of the basestation module is unloadable from the basestation at the first position.

14. The connection module as claimed in claim 1, wherein the connection module comprises electrical connectors and wherein the portion of the basestation module is electrically connected to the connection module at the second position.

15. A translating system for use in a basestation system having a basestation module, the translating system translating at least a portion of the basestation module between a first position of the basestation system and a second position of the basestation system, the second position proximate a top portion of the basestation system; wherein the portion of the basestation module is detachably connected to a connection module when the portion of the basestation module is at the second position.

16. The translating system as claimed in claim 15, further comprising a winch mechanism for raising or lowering the at least portion of the basestation module.

17. The translating system as claimed in claim 16, further comprising a movable motor for providing power supply to the winch mechanism.

18. The translating system as claimed in claim 15, wherein the portion of the basestation module is electrically connected to the connection module at the second position.

19. A method for maintenance of a basestation system having a translating system and a basestation module, the method comprising:
translating at least portion of the basestation module between a first position of the basestation system and a second position of the basestation system, the second position proximate a top portion of the basestation system, the first position being different from the second position; and
detachably connecting a connection module to the at least portion of the basestation module at the second position.

20. The method as claimed in claim 19, wherein connecting includes the step of connecting the at least portion of the basestation module to at least one electronic module at the second position through the connection module.

21. A method as claimed in claim 19, wherein the at least portion of the basestation module includes a transceiver module, and wherein the step of connecting includes the step of detachably connecting the transceiver module to an antenna, a communication cable, or a combination thereof at the second position through the connection module.

22. A method as claimed in claim 19, further comprising the step of unloading the at least portion of the basestation module at the first position.

23. A method as claimed in claim 19, further comprising electrically connecting the connection module with the portion of the basestation module at the second position.

* * * * *

UNITED STATES PATENT AND TRADEMARK OFFICE
CERTIFICATE OF CORRECTION

PATENT NO. : 8,401,491 B2
APPLICATION NO. : 12/404687
DATED : March 19, 2013
INVENTOR(S) : Charles W. T. Nicholls Page 1 of 1

It is certified that error appears in the above-identified patent and that said Letters Patent is hereby corrected as shown below:

In the Claims:

In Column 8, Line 64, Claim 4, delete "3" and insert -- 1 --, therefor.

In Column 9, Line 1, in Claim 5, delete "4" and insert -- 1 --, therefor.

In Column 9, Line 29, in Claim 12, delete "11" and insert -- 9 --, therefor.

Signed and Sealed this
Twenty-ninth Day of October, 2013

Teresa Stanek Rea
*Deputy Director of the United States Patent and Trademark Office*